United States Patent [19]

Tanaka

[11] Patent Number: 5,565,929
[45] Date of Patent: Oct. 15, 1996

[54] AUDIO-VISUAL CONTROL APPARATUS FOR DETERMINING A CONNECTION OF APPLIANCES AND CONTROLLING FUNCTIONS OF APPLIANCES

[75] Inventor: Shigeo Tanaka, Tokyo, Japan

[73] Assignee: Sony Corporation, Tokyo, Japan

[21] Appl. No.: 493,404

[22] Filed: Jun. 22, 1995

Related U.S. Application Data

[63] Continuation of Ser. No. 133,842, Oct. 12, 1993.

[30] Foreign Application Priority Data

Oct. 13, 1992 [JP] Japan .................................. 4-300391

[51] Int. Cl.$^6$ ................................................ H04N 5/44
[52] U.S. Cl. ........................ 348/565; 348/722; 348/705
[58] Field of Search .................................. 348/705, 706, 348/722, 569, 564, 565; H04N 5/44

[56] References Cited

U.S. PATENT DOCUMENTS

| | | | |
|---|---|---|---|
| 4,337,480 | 6/1982 | Bourassin et al. | |
| 4,771,283 | 9/1988 | Imoto . | |
| 4,808,992 | 2/1989 | Beyers, Jr. et al. | 348/706 X |
| 4,907,085 | 3/1990 | Bingham | 348/706 |
| 4,937,672 | 6/1990 | Anderson | 348/706 X |
| 4,949,179 | 8/1990 | Hosono | 348/565 |
| 4,989,081 | 1/1991 | Miyagawa et al. | 348/61 |
| 5,054,022 | 10/1991 | van Steenbrugge | 370/85.6 |
| 5,204,662 | 4/1993 | Oda et al. | 348/706 X |
| 5,237,417 | 8/1993 | Hayashi et al. | 348/569 |
| 5,291,343 | 3/1994 | Goto | 348/61 |
| 5,420,641 | 5/1995 | Tsuchida | 348/565 |
| 5,434,626 | 7/1995 | Hayashi et al. | 348/569 |
| 5,436,675 | 2/1995 | Hayashi et al. | 348/569 |
| 5,452,012 | 9/1995 | Saitoh | 348/569 |

FOREIGN PATENT DOCUMENTS

| | | |
|---|---|---|
| 0390041 | 10/1990 | European Pat. Off. . |
| 482952 | 4/1992 | European Pat. Off. . |
| 0505006 | 9/1992 | European Pat. Off. . |
| 0512604 | 11/1992 | European Pat. Off. . |
| 2283177 | 2/1991 | Japan . |
| 3098397 | 7/1991 | Japan . |
| 4167640 | 9/1992 | Japan . |
| 2191643 | 12/1987 | United Kingdom . |
| 2204755 | 11/1988 | United Kingdom . |

*Primary Examiner*—Victor R. Kostak
*Attorney, Agent, or Firm*—Jay H. Maioli

[57] ABSTRACT

An audio-visual control apparatus displays in a picture-in-picture window on a CRT an image corresponding to video signals outputted from one of a plurality of VTRs, making it possible to easily confirm the connection of appliances controlled by a control section, namely appliances connected to a TV set.

4 Claims, 9 Drawing Sheets

FIG. 7

| | |
|---|---|
| 1 CONFIRMATION OF APPLIANCE | NO.1 ADDRESS |
| 2 CONFIRMATION OF APPLIANCE | NO.2 ADDRESS |
| 3 CONFIRMATION OF APPLIANCE | NO.3 ADDRESS |
| 4 CONFIRMATION OF APPLIANCE | NO.4 ADDRESS |
| 5 CONFIRMATION OF APPLIANCE | NO.5 ADDRESS |
| 6 CONFIRMATION OF APPLIANCE | NO.6 ADDRESS |
| 7 CONFIRMATION OF APPLIANCE | NO.7 ADDRESS |
| 8 CONFIRMATION OF APPLIANCE | NO.8 ADDRESS |

21

AUDIO-VISUAL CONTROL APPARATUS FOR DETERMINING A CONNECTION OF APPLIANCES AND CONTROLLING FUNCTIONS OF APPLIANCES This is a continuation of application Ser. No. 08/133,842 filed Oct. 12, 1993.

BACKGROUND OF THE INVENTION

1. Field of the Invention

This invention relates to an audio-visual control apparatus which is suitable for an audio-visual apparatus to display video signals outputted from, for example, a video tape recorder (VTR) or a laser disc player (LDP).

2. Description of the Related Art

To control AV (audio-visual) appliances, it has been proposed to use a D2B (digital data bus) bus. In a case where AV appliances are connected to an AV center with the use of a D2B bus, however, it is inevitably required to confirm the presence of the connected electronic appliances by initializing them.

According to the conventional technology of the type described above, such initialization process is apt to become a source of trouble. Electronic appliances, when mistakenly initialized, need to be set up again from the start, requiring troublesome operation.

In a case where connected electronic appliances are not capable of executing functions, it is not possible to make the function of other connected appliances available.

Thus, operations to change addresses allocated to electronic appliances tend to become complicated and accordingly difficult for a user to understand.

SUMMARY OF THE INVENTION

It is a primary object of the present invention to provide an audio-visual control apparatus which ensures a correct connection of appliances.

It is another object of the present invention to provide an audio-visual control apparatus assured of improved operability.

It is yet another object of the present invention to provide an audio-visual control apparatus which is assured of excellent operability by making it easy to confirm addresses allocated to a plurality of electronic appliances of the same category connected to a bus.

In order to attain the objects described above, an audio-visual control apparatus according to the present invention comprises a control section for controlling electronic appliances outputting video signals, such as video tape recorders (VTRs) and laser disc players (LDPs), a selection section for selecting video signals outputted from VTRs and LDPs and a CRT display for displaying on its screen an image corresponding to video signals selected by the selection section in such a manner that the CRT displays in its picture-in-picture (hereinafter referred to as "P-in-P") area predetermined as desired an image corresponding to a selected one of the signals outputted from VTRs and LDPs controlled by the control section.

According to the present invention, an audio-visual control apparatus, furthermore, comprises a selection circuit for selecting a desired one from a plurality of electronic appliances, a RAM for storing functions of the plurality of electronic appliances, an input section for entering commands to the electronic appliances and a CPU for comparing functions of the electronic appliances inputted from the input section with those stored in a RAM and controlling the selection circuit based on the result of such comparison.

An audio-visual control apparatus according to the present invention sends out presence check commands through a bus to addresses of a plurality of appliances of the same category connected to the bus and confirms the allocation of addresses to appliances responding to the commands.

An audio-visual control apparatus according to the present invention controls electronic appliances such as VTRs and LDPs by a control section 9, selects out video signals outputted from VTRs and LDPs by a selection section 8 and displays on a screen 21 of a CRT 10 an image corresponding to the selected video signal. Furthermore, the CRT displays in a P-in-P area an image corresponding to video signals outputted from VTRs and LDPs controlled by the control section. Electronic appliances controlled by the control section can be thus confirmed.

In an audio-visual control apparatus according to the present invention, commands inputted from the input section and functions of electronic appliances stored in a RAM are compared and its selection circuit controlled according to the result of this comparison. A user is not required to memorize functions of all electronic appliances, making it possible to use functions of connected appliances in presence. Thus, an audio-visual control apparatus according to the present invention is assured of improved operability.

Since an audio-visual control apparatus according to the present invention sends out presence check commands to addresses of a plurality of appliances of the same category through a bus and confirms the allocation of addresses to electronic appliances responding to the commands, it is easy to confirm addresses.

BRIEF DESCRIPTION OF THE DRAWINGS

FIG. 7 is an address-confirming menu displayed on the CRT shown in FIG. 6;

DETAILED DESCRIPTION OF THE PREFERRED EMBODIMENT

Figure 1:
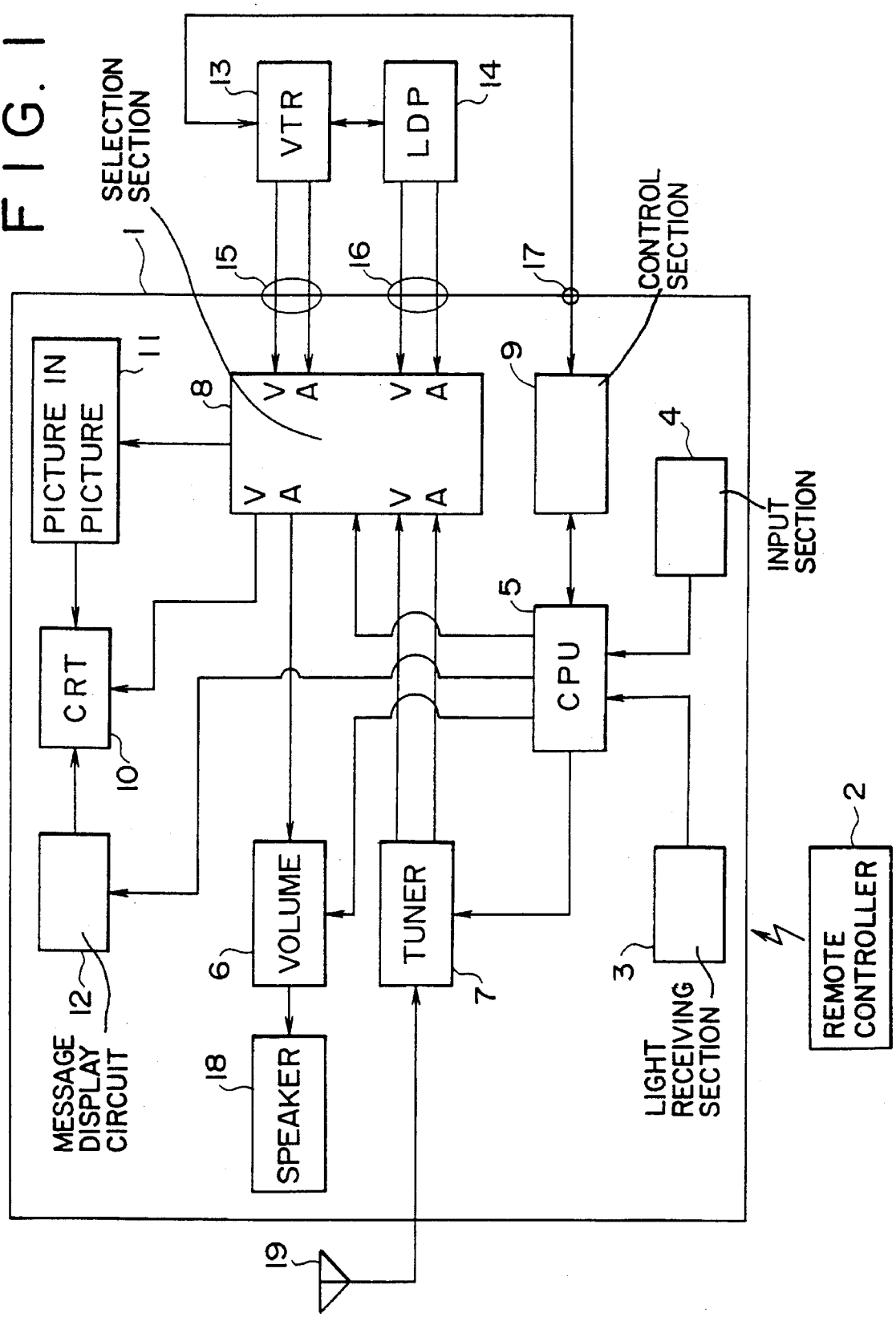
FIG. 1 is a block diagram showing the structure of an audio-visual control apparatus according to an embodiment of the present invention.

FIG. 1 is a block diagram showing the structure of an audio-visual control apparatus embodying the present invention. Designated by a reference numeral 2 is a remote controller which has a power switch for controlling the power source of an AV (audio-visual) center 1, a channel button for selecting a TV channel, a volume adjusting button for adjusting an audio level, a selection switch for selecting from video/audio signals inputted from a tuner 7, video/audio signals inputted to an external input terminal 15 or inputted to an external input terminal 16 wherein the video signals are to be displayed on a CRT (cathode ray tube) 10 and a control section for controlling appliances connected to the external input terminals 15 and which 16 and emits from a built-in light emission diode IR (infra-red) light corresponding to a switch (button) operated. A light receiving section 3 converts IR light emitted from the remote controller 2 into electric signals which are supplied to a CPU (central processing unit) 5. An input section 4 has switches (buttons) corresponding to those of the remote controller 2 and is operated to control the power source of the AV center 1, to select a TV channel and to control electronic appliances connected to the external input terminals 15 and 16.

When either the remote controller 2 or the input section 4 is operated, CPU 5 controls a volume 6, a tuner 7, a selection section 8, a control section 9 and a message display circuit 12 for displaying a message. Under the control of the CPU 5, the volume 6 adjusts an audio volume level outputted from a speaker 18 when it is operated by either the remote controller 2 or a volume adjusting switch of the input section 4. The tuner 7 selects a desired frequency band (channel) from TV signals supplied from an antenna 19, and picks up and supplies video/audio signals to the CRT 10 and the speaker 18 through the selection section 8.

The control section 9 is serially connected to the VTR (video tape recorder) 13 and the LDP (laser disc player) 14 through a control signal output terminal 17 and controls the power source of VTR 13 and the LDP 14 and the operational mode of video/audio replaying in response to operations of the remote controller 2 or the input section 4.

Controlled by the CPU 5, the selection section 8 selects one of the video signals outputted from the tuner 7 or signals fed to the external input terminal 15 or to the external input terminal 16 and sends the selected one to the CRT 10 and the speaker 18. Furthermore, the selection section 8 selects one of the video signals outputted through the external input terminals 15 and 16 from the VTR 13 and the LDP 14 controlled by the control section 9 and sends the selected one to a P-in-P (picture in picture) circuit 11. The P-in-P circuit 11 converts video signals supplied from the selection section 8 into P-in-P video signals. In other words, the P-in-P circuit 11 converts video signals supplied from the selection section 8 into P-in-P video signals corresponding to the signals to be displayed in a pre-set P-in-P window 22 on the screen 21 of the CRT 10 shown in FIG. 2.

Under the control of the CPU 5, the message display circuit 12, after the VTR 13 and the LDP 14 have been connected to the external input terminals 15 and 16, outputs character data to the CRT 10 to display pre-set messages in a message window 23 on the screen 21 in case its initialization is executed to identify (recognize) appliances connected to the external input terminals 15 and 16.

Figure 2:
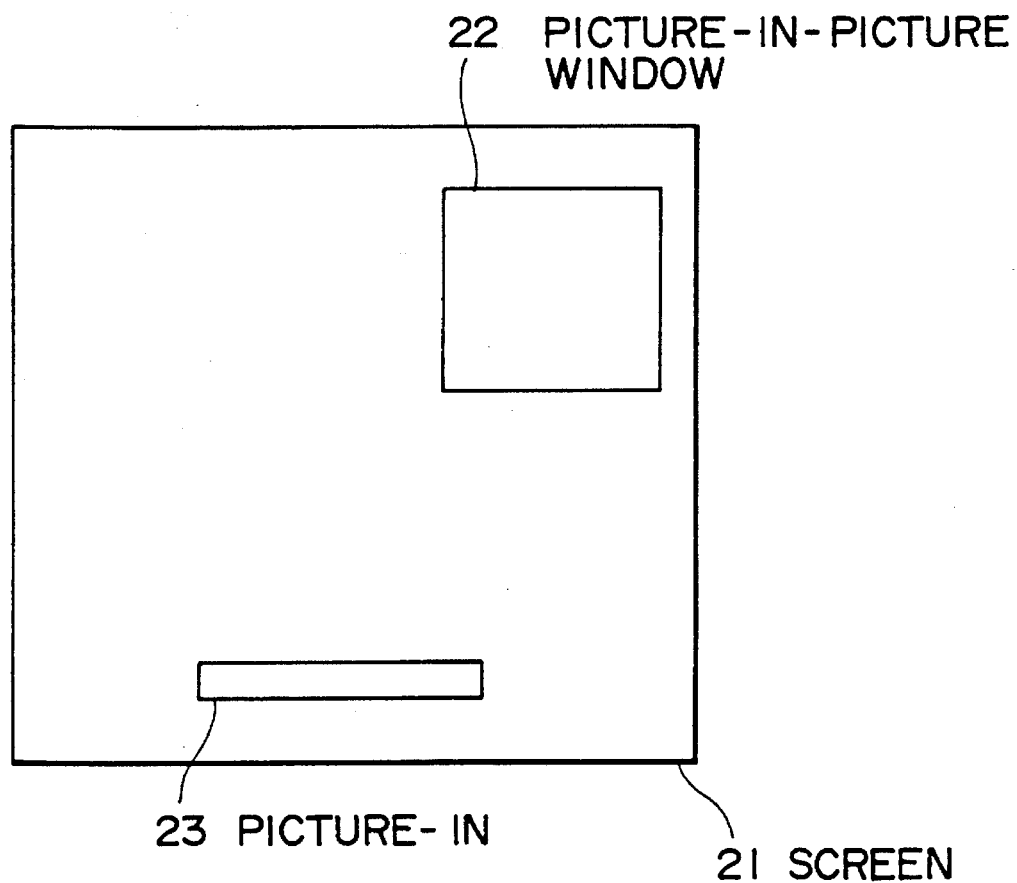
FIG. 2 is a drawing showing a screen of the CRT in the embodiment shown in FIG. 1.

As shown in FIG. 2, the CRT 10 displays on its screen 21 an image corresponding to video signals outputted from the selection section 8 and displays in the P-in-P window 22 and the message window 23 on the screen 21 video signals, an image and a message corresponding to video signals and character data supplied from the P-in-P circuit 11 and the message display circuit 12, respectively.

In the normal operation mode, one of the video signals outputted from the tuner 7, video signals supplied to the external input terminal 15 or video signals supplied to the external input terminal 16 is selected by the selection section 8 and the thus-selected video signal is supplied to the CRT 10 to display on the screen 21 of the CRT 10 an image corresponding to that signal.

To execute its initialization after the VTR 13 and the LDP 14 are connected to the external input terminals 15 and 16, the AV center 1 is set into its initialization mode from the remote controller 2 or the input section 4. When the AV center 1 is set into its initialization mode, the message display circuit 12 causes the CRT 10 to display in the message window 23 the names (appliance identification) of appliances which can be connected to the AV center 1. Thus, it becomes possible to select an appliance name "VTR" connected to (considered connected to) either one of the external input terminals 15 or 16 (15, for instance) and to enable the selection section 8 to select video signals input to the external input terminal 15 by operating either the remote controller 2 or the selection switch of the input section 4. Then, an appliance connected to (considered connected to) the external input terminal 15 selected earlier, namely the VTR 13, is enabled to output video signals (the VTR 13 is caused to start reproducing video signals) by operating the remote controller 2 or the control switch of the input section 4.

When the remote controller 2 is operated at this stage, the light emission diode built in the remote controller 2 emits IR light corresponding to the operation. This IR light is received at the light receiving section 3 to be converted into electric signals which are fed to the CPU 5. Likewise, electric signals corresponding to operation of the input section 4 are fed to the CPU 5.

When either the remote controller 2 or the input section 4 is operated as described above, the CPU 5 outputs control signals to the selection section 8 to selectively output to the P-in-P circuit 11 video signals inputted to the selected external terminal 15 and outputs control signals to the control section 9 to control an appliance connected to (considered connected to) the selected external input terminal 15, namely the VTR 13, to output video signals. In response to control signals outputted from the CPU 5, the selection section 8 is caused to selectively send to the P-in-P circuit 11 video signals inputted to the external input terminal 15. At the same time, the control section 9 is caused to, in response to control signals outputted from the CPU 5, output control signals to the VTR 13 through the control signal output terminal 17 to cause the VTR 13 to output video signals (the VTR 13 is caused to start reproducing video signals) and to reproduce video signals.

In the P-in-P circuit 11, video signals fed from the selection section 8 are converted into P-in-P video signals to be outputted to the CRT 10.

Meanwhile, the CPU 5 outputs control signals to the message display circuit 12 to confirm that an image outputted to the CRT 10 from the P-in-P circuit 11 corresponds to video signals outputted from an appliance corresponding to the pre-selected appliance name "VTR," namely the VTR 13, and outputs a row of characters in a form of a message reading, for example, "This is the VTR." In other words, the message display circuit 12 is controlled to output a row of characters reading "This is the VTR." to the CRT 10.

A P-in-P image corresponding to P-in-P video signals outputted from the P-in-P circuit 11, namely video signals inputted to the external input terminal 15, is displayed in the P-in-P window 22 on the CRT 10 and a row of characters outputted from the message display circuit 12 indicating "This is the VTR." is displayed in the message window 23.

Figure 9:
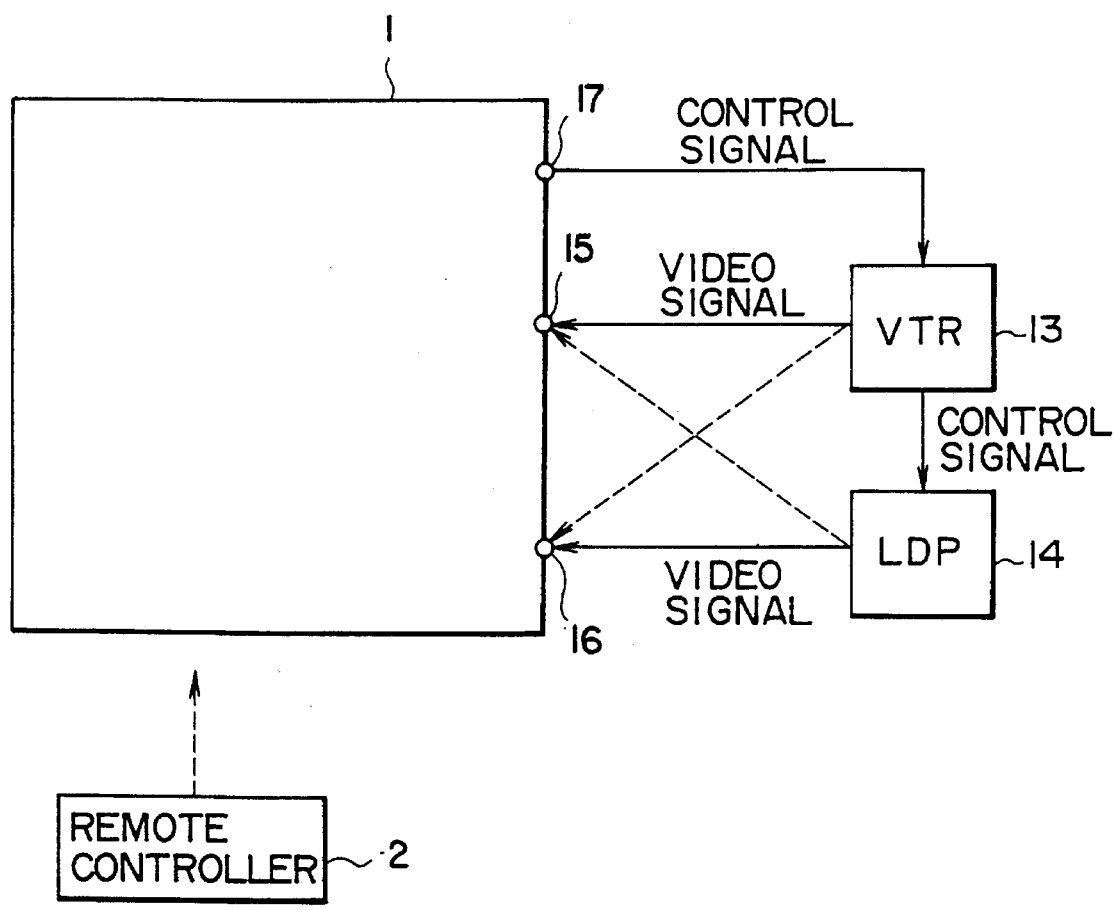
FIG. 9 is a block diagram showing the structure of a conventional video system.

When the VTR 13 is not connected to the external input terminal 15 and is connected incorrectly to the external input terminal 16 (as indicated by a dotted line in FIG. 9), video signals are outputted from the VTR 13 but the video signals selected at the selection section 8 to be outputted to the P-in-P circuit 11 are video signals inputted to the external input terminal 15. As video signals are thus not inputted to the external input terminal 15 in this case, the P-in-P window 22 remains blank (in a pre-set color like blue, for example).

Thus, it can be judged easily from a message (a row of characters) and an image displayed in the P-in-P window 22 whether the VTR 13 is connected to the external input terminal 15 or not.

Next, the message display circuit 12 causes the CRT 10 to display in the message window 23 the name of an appliance (appliance name) which can be connected to the AV center 1. It is now possible to select the name of an appliance "LDP" connected to (considered connected to) either of the external input terminals 15 or 16, namely the external input terminal 16 this time, by operating either the remote controller 2 or the selection switch of the input section 4. Then, either the remote controller 2 or the control switch of the input section 4 is operated to cause an appliance connected to (considered connected to) the external input terminal 16 selected earlier, namely the LDP 14, to output video signals (the LDP 14 is caused to start reproducing video signals).

When either the remote controller 2 or the input section 4 is operated as described above, the CPU 5 outputs control signals to the selection section 8 to selectively output to the P-in-P circuit 11 video signals inputted to the selected external input terminal 16 and outputs control signals to the control section 9 to control an appliance connected to (considered connected to) the selected external input terminal 16, namely the LDP 14, to output video signals. In response to control signals outputted from the CPU 5, the selection section 8 is caused to selectively send to the P-in-P circuit 11 video signals inputted to the external input terminal 16. At the same time, the control section 9 is caused to, in response to control signals outputted from the CPU 5, output control signals to the LDP 14 through the control signal input terminal 17 to cause the LDP 14 to output video signals (the LDP 14 is caused to start reproducing video signals) and start reproducing video signals.

In the P-in-P circuit 11, video signals fed from the selection section 8 are converted into P-in-P video signals to be outputted to the CRT 10.

Meanwhile, the CPU 5 outputs control signals to the message display circuit 12 to confirm that an image outputted to the CRT 10 from the P-in-P circuit 11 is corresponding to video signals outputted from an appliance corresponding to the pre-selected appliance name "LDP," namely the LDP 14, and output a row of characters in a form of message reading, for example, "This is the LDP." In other words, the message display circuit 12 is controlled to output a row of characters reading "This is the LDP." to the CRT 10.

A P-in-P image corresponding to P-in-P video signals outputted from the P-in-P circuit 11, namely video signals inputted to the external input terminal 16, is displayed in the P-in-P window 22 on the CRT 10 and a row of characters outputted from the message display circuit 12 reading "This is the LDP." is displayed in the message window 23.

When the LDP 14 is not connected to the external input terminal 16 and is connected incorrectly to the external input terminal 15 (as indicated by a dotted line in FIG. 9), video signals are outputted from the LDP 14 but video signals selected at the selection section 8 and outputted to the P-in-P circuit 11 are video signals inputted to the external input terminal 16. As video signals are thus not inputted to the external input terminal 16 in this case, the P-in-P window 22 remains blank (in a pre-set color like blue, for example).

Thus, it can be judged easily from a message (a row of characters) and an image displayed in the P-in-P window 22 whether the LDP 14 is connected to the external input terminal 16 or not.

Figure 3:
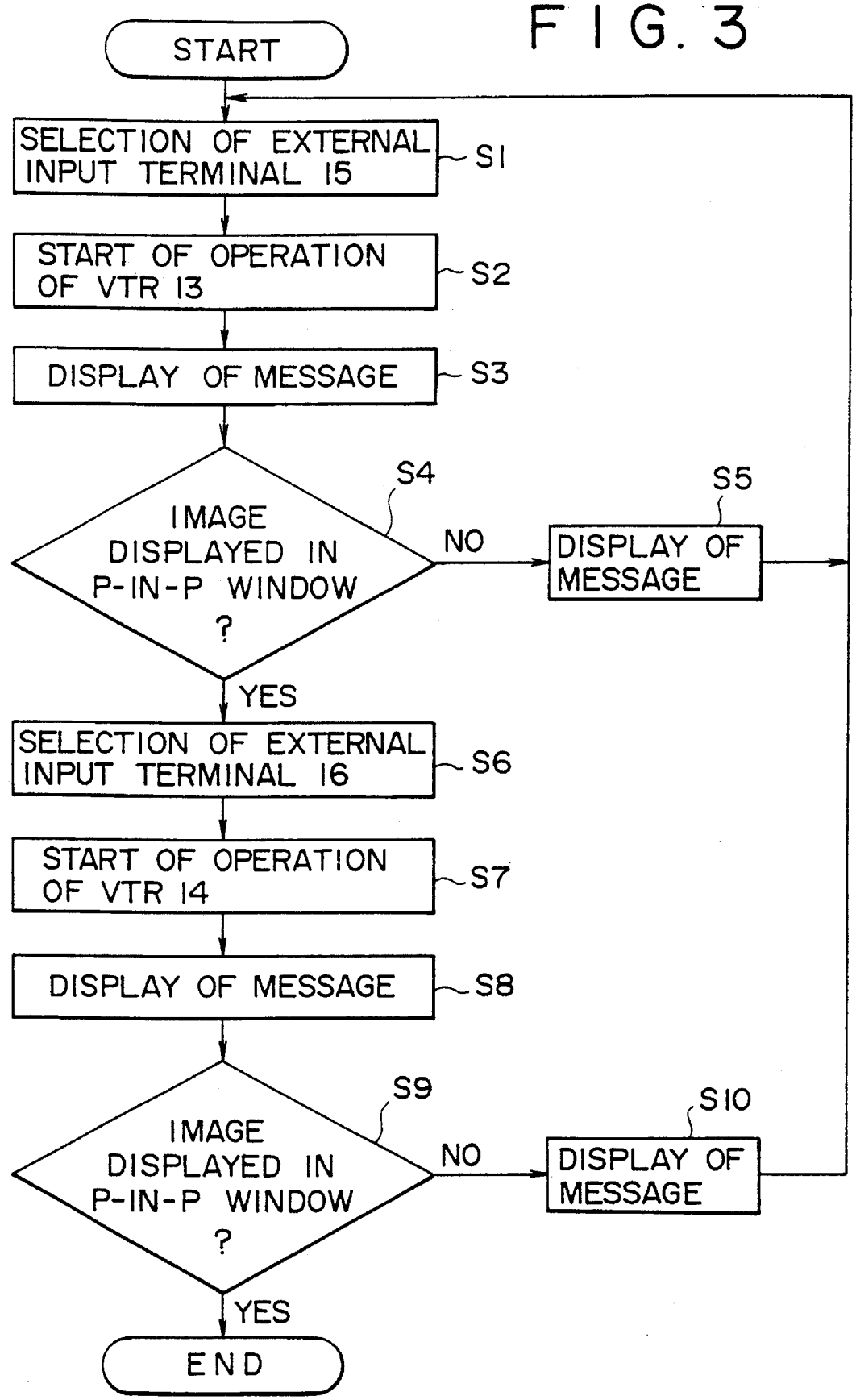
FIG. 3 is a flow chart showing operations of the embodiment shown in FIG. 1.

The operation of the above-described audio-visual control apparatus now will be explained with reference to a flow chart shown in FIG. 3. In Step S1 in initialization mode, video signals inputted to the external input terminal 15 out of the external input terminals 15 and 16 are selected. Outputting of video signals from the VTR 13 considered connected to the external input terminal 15 selected in Step S1, namely reproduction of video signals by the VTR 13, is started in Step S2, with the process shifting to Step S3 where a row of characters (message) reading "This is the VTR." is displayed in the message window 23 of the screen 21. In Step S4, it is judged whether an image is displayed in the P-in-P window 22. When the P-in-P window 22 is judged in Step S4 to be displaying no image, namely when video signals outputted from the VTR 13 are not fed to the external input terminal 15 with the VTR 13 not connected to the external input terminal 15, the process shifts to Step S5 to display in the message window 23 a row of characters telling a user the state of the current connection between the AV center 1 and the VTR 13 in a message reading "VTR is not correctly connected. Check connection." After this, the process returns to Step S1. This process is repeated from Step S1 to Step S5 until the P-in-P window 22 turns out to display an image in Step S4.

When the P-in-P window 22 is judged to be displaying an image in Step S4, video signals inputted to the other of the external input terminals 15 and 16, which was not selected in Step S1, are now selected in Step S6. In Step S7, outputting of video signals from the LDP 14 considered connected to the external input terminal 16 selected in Step S6, namely reproduction of video signals by the external LDP 14, is started in Step S7, shifting the process to Step S8 where a row of characters (message) reading "This is the LDP." is displayed in the message window 23 on the screen 21. In Step S9, it is judged whether the P-in-P window 22 is displaying an image or not. When the P-in-P window 22 is judged to be displaying no image in Step S9, namely when video signals outputted from the LDP 14 are not fed to the external input terminal 16 with the LDP 14 not connected to the external input terminal 16, the process shifts to Step S10 to display in the message window 23 a row of characters telling a user the state of the current connection between the AV center 1 and LDP 14 in a message reading "LDP is not correctly connected. Check connection." After this, the process returns to Step S1. This process is repeated from Step S1 to Step S10 until the P-in-P window 22 turns out to display an image in Step S4 and S9.

When the P-in-P window 22 is judged in Step S4 and Step S9 to be displaying an image, the process is terminated.

Since video signals outputted from an appliance are displayed in the P-in-P window and confirmed as described above, correct connection of appliances can be realized easily.

Figure 4:
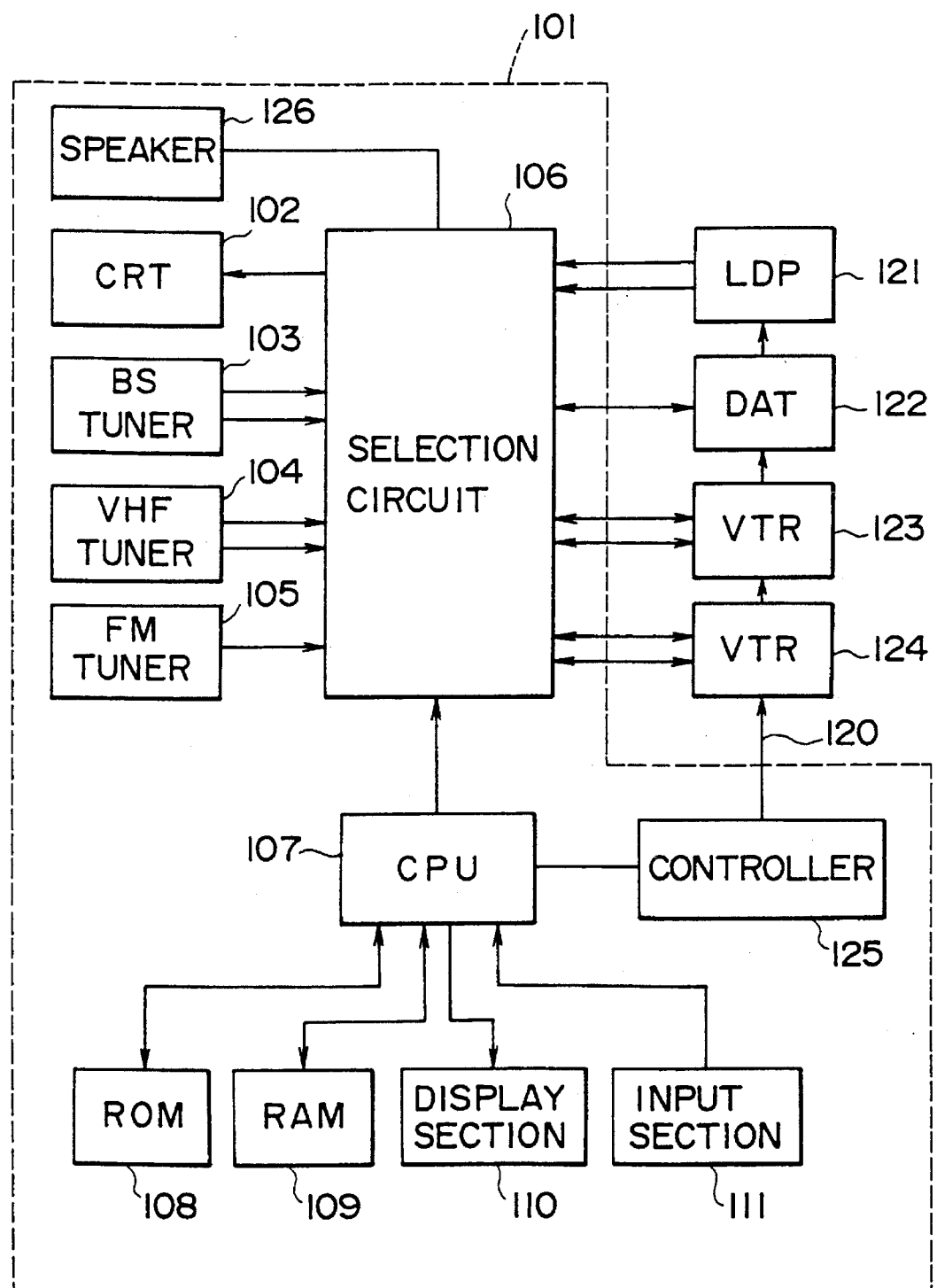
FIG. 4 is a block diagram showing the structure of an audio-visual system employing an audio-visual control apparatus according to the present invention.

FIG. 4 is a block diagram showing the structure of an AV (audio-visual) system employing an audio-visual control apparatus of the present invention. In this embodiment of the present invention, an LDP 121, a DAT (digital audio tape) 122 and VTRs 123 and 124 as electronic appliances are connected to an AV center 101 through a bus 120 which cascades them.

The AV center 101 has built therein a BS (broadcast satellite) tuner 103, a VHF tuner 104 and an FM tuner 105 which are connected to a selection circuit 106 together with the LDP 121, the DAT 122 and the VTRs 123 and 124 as connected external electronic appliances. The selection circuit 106 also has connected thereto a CRT 102 and a speaker 126 which display and output signals from one of the above-described electronic appliances. Under the control of a CPU 107, this selection circuit 106 can send out any one of the inputs to either one of the output appliances, respectively. Designated by a reference numeral 125 is a controller.

A ROM 108 stores in memory programs and desired data necessary to make the CPU 107 functioning. A RAM 109 stores in memory, as required, necessary data for desired functioning. A display section 110, composed of a lamp, an LED and an LCD, is used to display desired messages. An input section 111, including switches and buttons, is operated to input desired commands.

Figure 5:
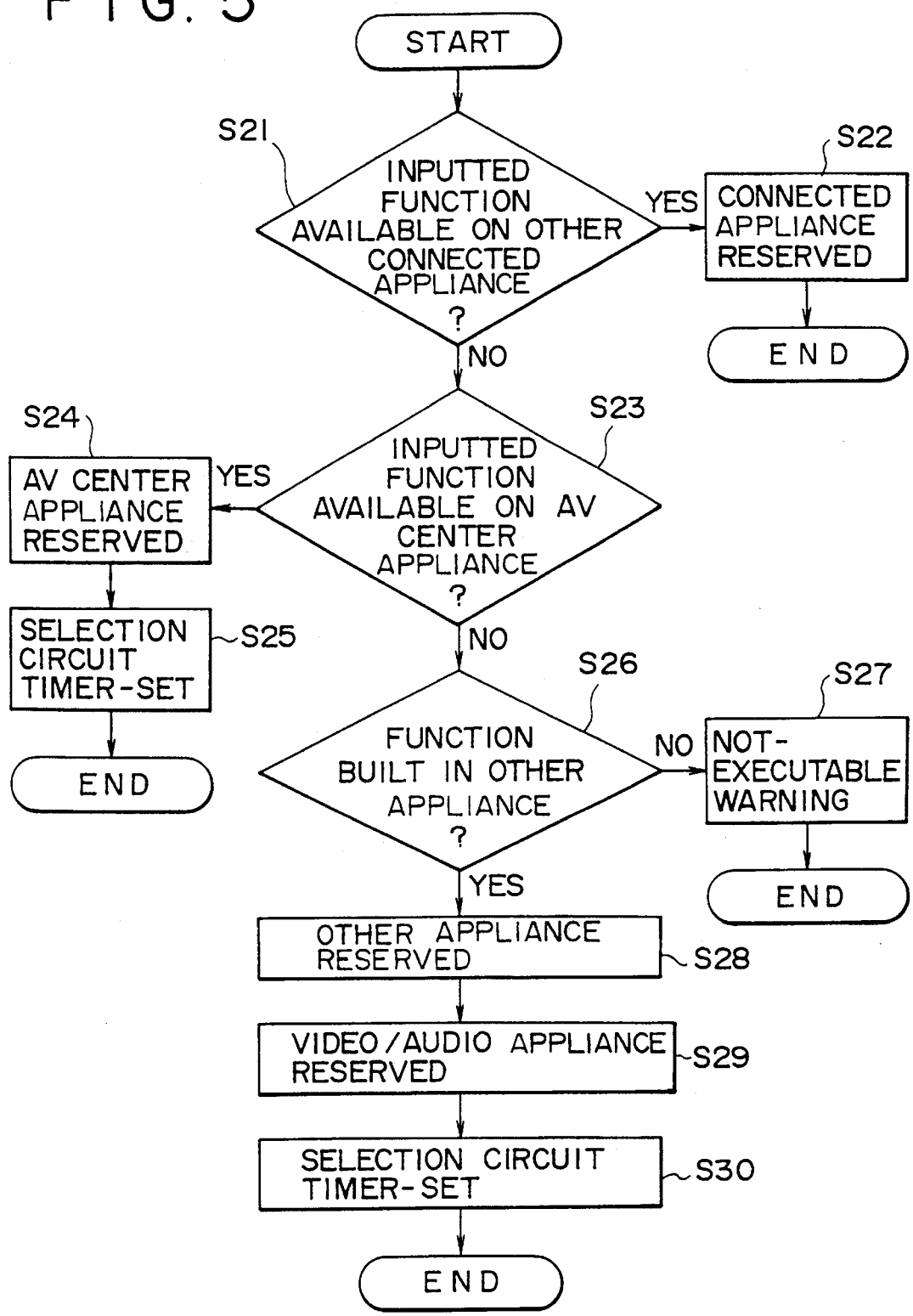
FIG. 5 is a flow chart showing operations of the embodiment shown in FIG. 1.

It will now be explained along with a flow chart shown in FIG. 5 how the audio-visual control apparatus is operated by the input section 111 in order to execute, for example, the following timer settings:

| 1 | 10:00–11:00 | VHF8CH | VTR123 |
|---|---|---|---|
| 2 | 12:00–13:00 | BS5CH | VTR124 |
| 3 | 12:00–13:00 | BS3CH (Audio) | DAT122 |
| 4 | 17:00–18:00 | FM2CH (Audio) | DAT122 |

In other words, VHF Channel 8 video signals are to be recorded on the VTR 123 from 10:00 to 11:00; BS Channel 5 video signals on the VTR 124 from 12:00 to 13:00; BS Channel 3 audio signals on the DAT 122 from 12:00 to 13:00 and FM Channel 2 audio signals on the DAT 122 from 17:00 to 18:00.

When the above timer setting data are input from the input section 111, the CPU 107 causes the RAM 109 to temporarily store them in memory. All the functions of the connected external electronic appliances, including the LDP 121, the DAT 122 and the VTRs 123 and 124 which are connected to the selection circuit 106, and all the built-in electronic appliances, including the BS tuner 103, the VHF tuner 104 and the FM tuner 105, are pre-memorized in the RAM 109. The memorized data, to be initialized and set up by a user by operating the input section 111, are protected not to be erased when the power source of the AV center 101 is turned off.

In the timer setting process, it is first judged whether a function inputted for its time-set execution can be executed by a selected connected external electronic appliance. For instance, it is judged whether the VTR 123 has a built-in VHF tuner or not or whether the VTR 123 has video recording capability or not. When the inputted function is judged as available, the process shifts to Step S22 to write in the RAM 109 to cause the selected electronic appliance to execute the inputted function (timer-set).

When a function inputted for its timer-set execution is judged as not executable on a selected connected external electronic appliance (when the VTR 123 has no built-in VHF tuner, for instance), the process shifts to Step S23 to judge whether the function is executable on an electronic appliance built in the AV center 101. When the function is judged as available on one of the built-in electronic appliances, that built-in electronic appliance is reserved in Step S24 (for instance, the VHF tuner 104 is reserved). In Step S25, the selection circuit 106 is timer-set to execute a desired connection (to feed output signals from the VHF tuner 104 to the VTR 123 from 12:00 to 13:00, for instance).

When a function inputted for its time-set execution is judged as not available on one of electronic appliances built in the AV center 101 (when the AV center 101 has no built-in VHF tuner, for instance), the process shifts to Step S26 to judge whether there is any other connected external electronic appliance available to execute the function (whether the other VTR 124 has a built-in VHF tuner, for instance). When none of the other connected external electronic appliances has no capability to execute the function (when none of the LDP 121, the DAT 122 and the VTRs 123 and 124 has a built-in VHF tuner, for instance), the process shifts to Step S27 to display on the display section 110 a message that the inputted function is not available (not executable on the VTR 123 to record video signals on VHF Channel 8, for instance). When the function itself is executable but already reserved for the same period of time, the function is displayed as not executable.

When the function is judged in Step S26 as executable on one of the other connected external electronic appliances (when the VTR 124 has a built-in VHF tuner, for instance), that appliance (a VHF tuner built in the VTR 124) is reserved in Step S28 and an electronic appliance timer-set to record video or audio signals (namely the VTR 123) is reserved in Step S29. In Step S30, the selection circuit 106 is timer-set for the required connection (to feed output signals from the VHF tuner of VTR 124 to VTR 123).

Figure 6:
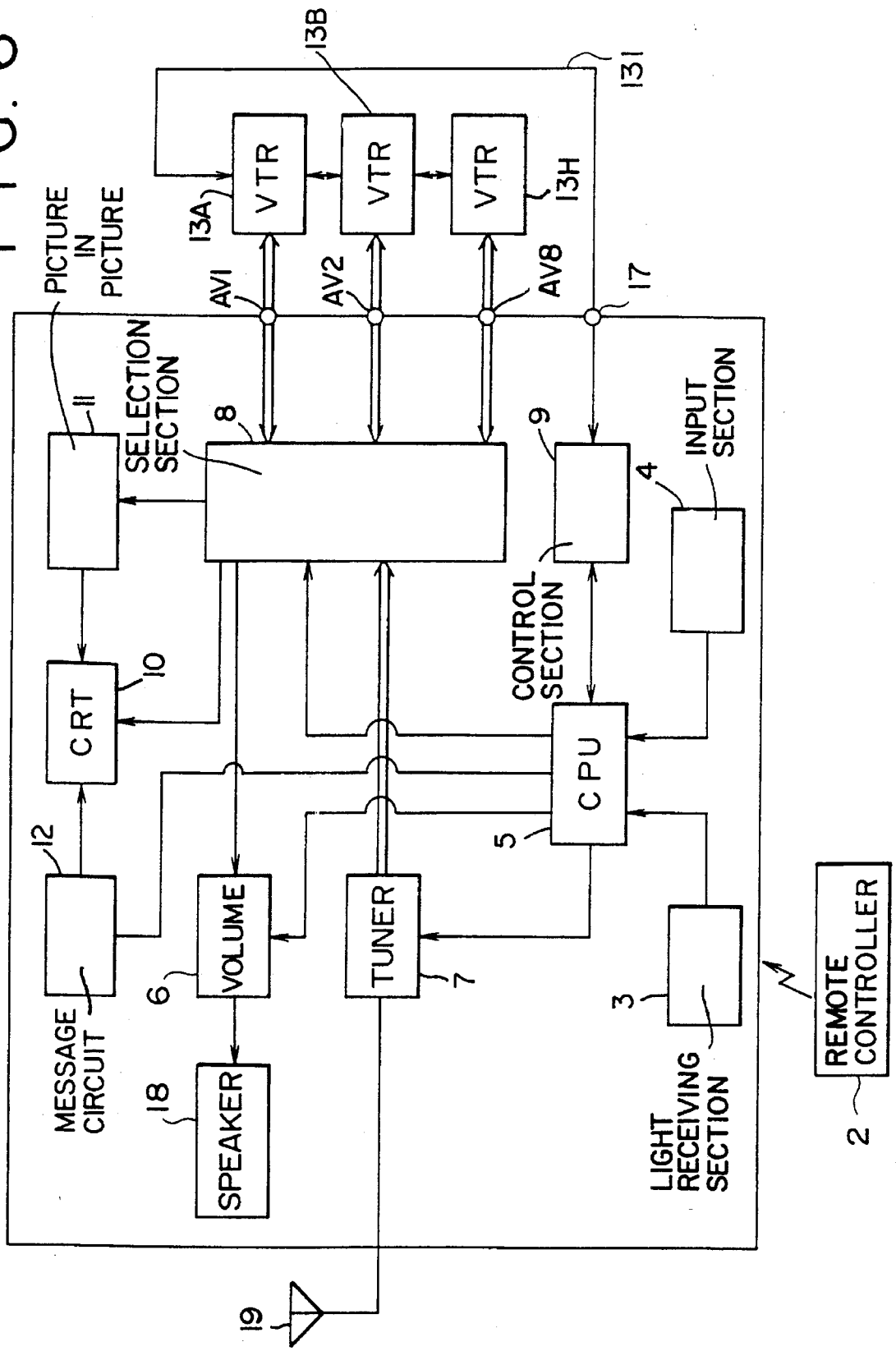
FIG. 6 is a block diagram showing the execution of an address-confirming method according to the present invention.

FIG. 6 shows an AV system employing a method according to the present invention to confirm appliance addresses. In this embodiment, eight VTRs 13A to 13H are connected to the control section 9 of the AV center, that is the TV set 1, through a D2B (digital data bus) bus (AV bus) 131. Audio signals and video signals from VTRs 13A to 13H are fed to the selection section 8 through terminals AV1 to AV8.

Figure 8:
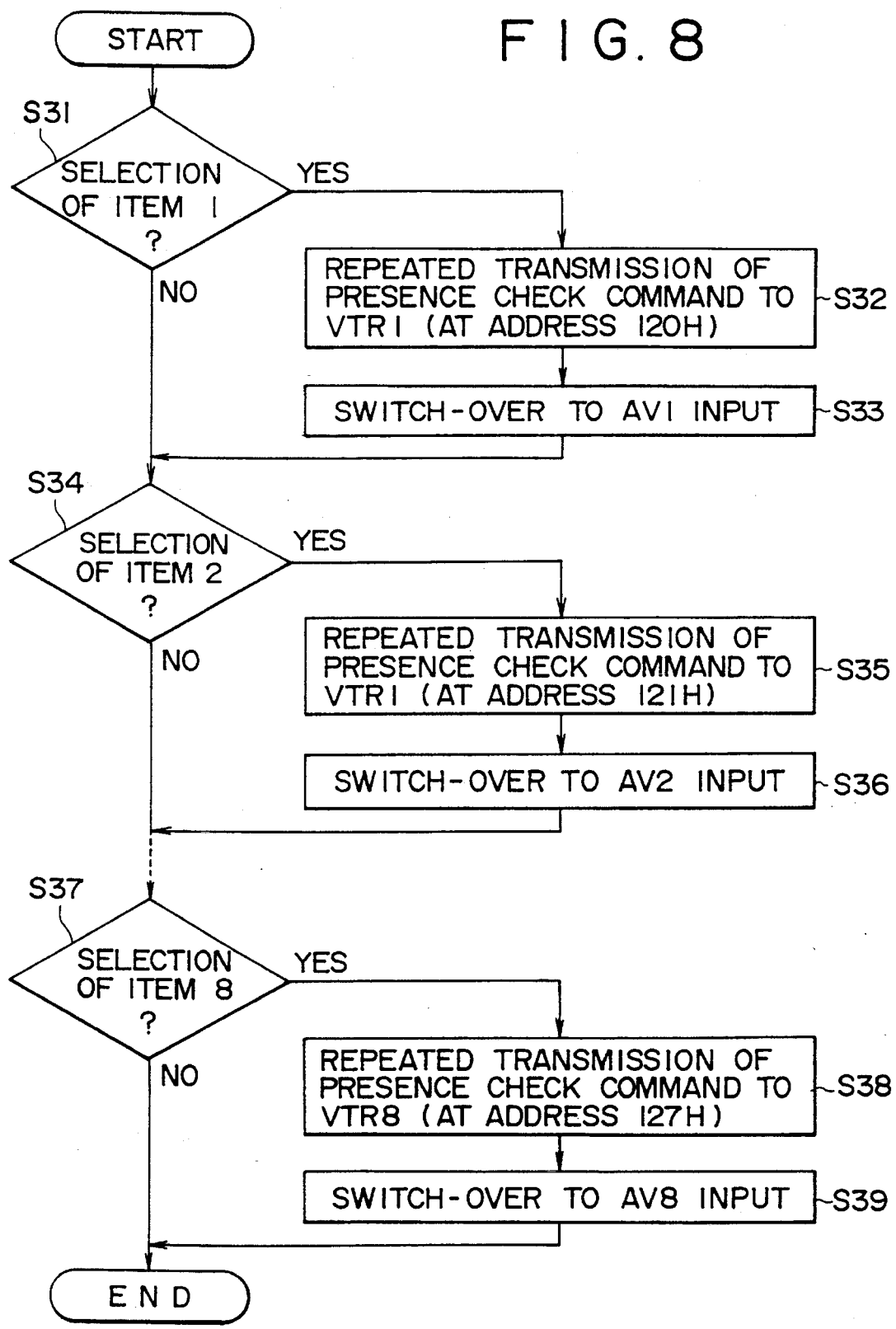
FIG. 8 is a flow chart showing operations of the audio-visual system executing address-confirming operations according to the present invention.

FIG. 7 shows an address confirming menu to be displayed on the CRT 10 shown in FIG. 6, and FIG. 8 shows an address-confirming process, namely the operation of the AV system shown in FIG. 6. When the first item on the address-confirming menu showing Appliance No. 1 (namely the VTR 13A) is selected by a cursor operated from either the remote controller 2 or the input section 4 (Yes in Step S31), the CPU 5 in the AV center 1 repeatedly sends a presence check command to an address of the smallest value 120H (H represents hexadecimal notation) assumed as allocated to Appliance No. 1 or the VTR 13A through the D2B bus 131 (Step S32).

A presence check command is to command a master appliance (the AV center 1 in the above embodiment) to "respond." An appliance receiving this command indicates to the user with a display or sound that it is "receiving a presence check command."

Upon its reception of a presence check command, Appliance No. 1 or the VTR 13A keeping its address allocated at 120H when switched on in a normal manner bleeps and flashes an LED on its front panel, indicating that an address at 120H is allocated to it. When the CPU 5 controlling the selection section 8 sends to the CRT 10 signals inputted to the terminal AV1, output video signals from the VTR 13A, including characters, are displayed on the CRT 10 to indicate its reception of a presence check command (Step S33). Therefore, the user can confirm that an address at 120H is allocated to the VTR 13A.

When an appliance (namely the VTR 13A) other than the assumed appliance is receiving a presence command, the address of that appliance is changed to another address by means of a dip switch or button and the assumed appliance (namely the VTR 13A) is re-addressed by means of a dip switch or a button to an address allocated to Appliance No. 1, namely at 120H, to receive a presence check command.

When the second item on the address-confirming menu showing Appliance No. 2 (namely the VTR 13B) is selected next by a cursor operated from either the remote controller 2 or the input section 4 (Yes in Step S34), the CPU 5 in the AV center 1 repeatedly sends a presence check command through the D2B bus 131 to an address of the second smallest value 121H assumed as allocated to Appliance No. 2 or the VTR 13B (Step S35).

Upon its reception of a presence check command, Appliance No. 2 or the VTR 13B keeping its address allocated at 121H when switched on in a normal manner bleeps and flashes an LED on its front panel, indicating that an address at 121H is allocated to it. When CPU 5 controlling the selection section 8 sends to the CRT 10 signals inputted to the terminal AV2, output video signals from the VTR 13B, including characters, are displayed on the CRT 10 to indicate its reception of a presence check command (Step S36). Therefore, a user can confirm that an address at 121H is allocated to the VTR 13A.

When an appliance other than the assumed appliance (namely VTR 13B, for instance) is receiving a presence command, the address of that appliance is changed to another address by means of a dip switch or button and the assumed appliance (namely VTR 13B) is re-addressed by means of a dip switch or a button to an address allocated to Appliance No. 2, namely at 121H, to receive a presence check command.

Following this, the address-confirming operation is executed in a similar manner with respect to Items 3 to 8 (namely the VTRs 13C to 13H) on the address-confirming menu shown in FIG. 7 to confirm their respective addresses (Steps S37, S38 and S39).

It may be possible to set addresses for all appliances by changing their respective dip switches or by pressing their own respective address set-up buttons before their address before the address confirmation. Such appliances of the same category may be allocated addresses (addresses can be allocated to up to eight units of each category) from the smallest value in order and their power source switches (main power switches) are turned on in order and of their connection to the power outlet (in the case of appliances which are set into their stand-by mode when they are connected to the power outlet).

Furthermore, address setting may also be effected by first initializing all VTRs to the address 120H upon their switching-on and sending out a presence check command through the D2B bus to a group of appliances of the same category addressed at 120H to let all VTRs flash LEDs on their front panels. Then, CPU 5 in the AV center 1 sends out a message to the CRT 10 through the message circuit 12 to display that the address 120H can be allocated to a VTR by operating its initialization button. Thus, that address is allocated to a VTR of which the initialization button is operated in response to the command. The address-allocated VTR then sends a command to the other remaining VTRs addressed at 120H to set their address at 121H.

The CPU 5 in the AV center 1 then sends a presence check command through the D2B bus to a group of appliances with the 121H address. Upon their reception of this command, the remaining VTRs flash LEDs on their front panels. Then, CPU 5 in the AV center 1 sends out a message to the CRT 10 through the message circuit 12 to display that the address 121H can be allocated to a VTR by operating its initialization button. Thus, that address is allocated to a VTR of which the initialization button is operated in response to the command. The address-allocated VTR sends out a command to the other remaining VTRs addressed at 121H to set their address at 122H. This process is repeated until all VTRs connected to the D2B bus are cleared through. In the last step of the process, an attempt by the last address-set VTR to send an address set command is responded to with a transmission error as no other VTR with the same address as its address is connected to the bus or remaining on the system. The last VTR thus enabled to judge that no other VTRs are connected to the bus notifies the AV center 1 through the bus D2B that there is no other VTR remaining on the system with the same address.

In the above-described embodiment, VTRs are used as an example of plural appliances of the same category which can be any appliances of other types such as LDPs.

Furthermore, the present invention can be employed not only for AV appliances but for a plurality of appliances of the same category connected to a bus.

In an audio-visual control apparatus according to the present invention, a control means controls appliances outputting video signals, a selection means selects video output signals and a display means displays an image corresponding to video signals selected by the selection means. Furthermore, the displays means displays in a predetermined area an image corresponding to video signals outputted from an appliance controlled by the control section.

In an audio-visual control apparatus according to the present invention, an appliance is selected by comparing an inputted command and memorized functions of electronic appliances. Thus, a user can make a desirable function available simply by designating and inputting its corresponding command. Therefore, it is not necessary for a user to remember functions of all appliances and even to designate an appliance to provide a desired function, depending on the case. Thus, an audio-visual control apparatus according to the present invention is assured of a high degree of operability.

In an address-confirming method according to the present invention, check commands are sent out to addresses of a plurality of appliances of the same category through a bus to confirm the allocation of addresses to appliances responding to the commands. While thus made easy, the address setting according to the present invention not requiring addresses to be allocated to appliances in the order they are powered on is flexible. Having now fully described the invention, it will be apparent to one of ordinary skill in the art that many changes and modifications can be made thereto without departing from the spirit and scope of the invention as set forth herein.

What is claimed is:

1. An audio-visual control apparatus for controlling a plurality of audio-visual appliances comprising:

input means for inputting a command to control a function of one of said plurality of audio-visual appliances;

processing means connected to said input means for receiving said command and for outputting a control signal corresponding to said command;

control means connected to said processing means and to said plurality of audio-visual appliances for sending said control signal to a corresponding one of said plurality of audio-visual appliances;

selection means connected to said processing means and to said plurality of audio-visual appliances for selecting one of a plurality of output signals of said plurality of audio-visual appliances in accordance with said control signal and outputting said selected output signal;

a picture-in-picture circuit connected to said selection means;

CRT display means connected to said selection means and to said picture-in-picture circuit for displaying a video component of said selected output in a picture-in-picture section of a screen of said CRT display means; and message means connected to said processing means and to said CRT display means for outputting names of audio-visual appliances connected to said selection means for display in a message display section of said CRT display means, wherein said picture-in-picture display section is blank when an audio-visual appliance corresponding to said selected output signal is not connected to said selection means.

2. An audio-visual control apparatus according to claim 1, further comprising volume means connected to said control means and to said selection means; and a speaker unit connected to said volume means for outputting an audio component of said selected signal, wherein said control means outputs a volume control signal to said volume means for controlling a volume of said speaker unit.

3. An audio-visual control apparatus for controlling a plurality of audio-visual appliances comprising:

selection switch means connected to said plurality of audio-visual appliances for selectively supplying a video signal for display from one of said plurality of audio-visual appliances;

memory means for storing functions of each of said plurality of audio-visual appliances;

entering means for entering a command to control one of said functions of said plurality of audio-visual appliances;

control means connected to said selection switch means, to said entering means, and to said memory means to selectively apply said command to a corresponding function of said selected audio-visual appliance and to control said selection switch means to supply the video signal for display;

a display section connected to said control means for displaying a message related to said selected audio-visual appliance; and CRT display means for displaying a video signal output from said selected audio-visual appliance that is connected to said CRT display means by said selection switch means.

4. An audio-visual control apparatus for controlling a plurality of audio-visual appliances comprising:

selecting means for selecting for operation one of said plurality of audio-visual appliances;

control means responsive to said selecting means being connected to each of said plurality of audio-visual appliances of a same category for controlling functions thereof and for repeatedly sending a presence check command to said selected one of said plurality of audio-visual appliances; and means installed in each of said plurality of audio-visual appliances for responding to said presence check command transmitted from said control means by producing one of a display or a sound to a user.

* * * * *